United States Patent [19]
Reinecke

[11] Patent Number: 5,230,243
[45] Date of Patent: Jul. 27, 1993

[54] DEVICE FOR SURVEILLANCE OF TIRE PRESSURES

[75] Inventor: Erich Reinecke, Burgdorf, Fed. Rep. of Germany

[73] Assignee: WABCO Westinghouse Fahrzeugbremsen GmbH, Hanover, Fed. Rep. of Germany

[21] Appl. No.: 581,526

[22] Filed: Sep. 12, 1990

[30] Foreign Application Priority Data

Sep. 14, 1989 [DE] Fed. Rep. of Germany ....... 3930813

[51] Int. Cl.⁵ ............................................. B60C 23/02
[52] U.S. Cl. ................................. 73/146.3; 73/146.8; 73/729; 116/34 R
[58] Field of Search ................. 73/146.8, 146.3, 146.5, 73/708, 729, 744; 116/34 R; 340/442

[56] References Cited

U.S. PATENT DOCUMENTS 2,770,134 11/1956 Galperin ............................ 73/146.8
4,384,543 5/1983 Wong ................................ 73/146.8
4,686,855 8/1987 Smith ................................ 73/146.8

Primary Examiner—Donald O. Woodiel
Attorney, Agent, or Firm—Horst M. Kasper

[57] ABSTRACT

The tire surveillance device of the invention includes a pressure measurement member, where the signal of the pressure measurement member is corrective dependent on the temperature and evaluation unit actuated by the resulting signal. The correction member (21, 34) is disposed such that it is exposed to the temperature prevailing outside of the tire (1). The disposition of the correction member avoids considering erroneous temperatures resulting for example from a heat stream generated by the braking device in the rim of the wheel.

30 Claims, 3 Drawing Sheets

DEVICE FOR SURVEILLANCE OF TIRE PRESSURES

BACKGROUND OF THE INVENTION

1. Field of the Invention

The invention relates to a device for tire pressure surveillance with a pressure measurement member furnishing a tire pressure depending signal and an evaluation unit actuated upon a falling of the tire pressure below a tire pressure limiting value and actuated by the signal of the pressure measurement member as well as a correction member correcting the signal of the pressure measurement member depending on temperature.

2. Brief Description of the Background of the Invention including Prior Art

Such a device for surveillance of tire pressures is known from the European Patent EP-0 248 821 B. The device according to the European Patent EP-0 248 821 B is disposed following to the tire interior in the rim base. The pressure measurement member and the correction member for correcting the signal of the pressure measurement member depending on temperature are united and integrated constructively. This results of the formation of the pressure measurement member as a pressure measurement box, which furnishes a pressure depending stroke as a signal. The known device employs as an evaluation unit a magnetic distance path sensor capturing the stroke furnished by the pressure measurement box as a signal of the pressure measurement member. The known device is based on the idea that the included reference volume in the pressure measurement member assumes the tire air temperature based on a direct contact between the tire air and the pressure measurement member and that the pressure of the reference volume and thus also the signal of the pressure measurement member are changing with this temperature of the tire. Thus, it is a purpose to exclude errors in the tire pressure limiting value caused by the air temperature in the tire.

The temperature and thus the pressure of the reference volume do not depend only on the tire air temperature but also on the heat stream coming from the base rim into the device. This heat stream and the temperature increase caused in the device by this heat stream can be substantial, since the rim and in particular the rim base are heated up very much, based on the braking device incorporated into the rim and based on actuation of the brake. It has been shown that the signal of the pressure measurement member is thus overcompensated based on this heat flow and temperature flow, that the evaluation unit is erroneously actuated. Depending on the kind of the use made of the actuation of the evaluation unit, false and incorrect tire pressure information and/or an erroneous tire pressure automatic control process are initiated and employed.

In order to avoid this disadvantage it is known to insulate the device for tire pressure surveillance by intermediately disposing heat insulating material and by using similar measures against the heat stream from the base of the rim. However, these steps are associated with substantial expenditures.

The German Patent Application Laid Open DE 35 39 89 to Manfred Gerresheim et al. teaches a method for determining a variable air pressure value of a vehicle air tire and to display of such pressure value. The Figs. of the reference show in the diagram the tire overpressure and ploted against the inner temperature. Methods are indicated to determine the pressure deviation depending on the set point tolerance regions and a certain pressure state and to display an air pressure state taking into consideration regional and seasonal caused pressure and temperature influences. Apparently, heat and temperatures caused by braking are not compensated.

The German Patent Application Laid Open DE- 34 45 854 to Erich Zabler teaches a device for surveillance of predetermined values in motor vehicle tires. In particular a sensor unit is disposed at the tire wheel which transfers an emitted signal which depends on the pressure in the tire to a fixed position receiver (14). The sensor allows to survey both the tire pressure as well as the tire temperature. An influence of heat flow to the rim from braking is not considered in the reference.

The German Patent Application Laid Open DE 28 54 518 to Günter Pruss teaches a device for surveillance and display of the pressure in a motor vehicle tire. The device substantially includes a shaft (1) and a membrane receiver (2) which are solidly connected to each other. Both the shaft (1) and the membrane receiver (2) of the reference are formed as hollow cylinders. The membrane (5) then can perform motions in the direction of the longitudinal axis of the shaft. The inner pressure of the tire is transferred to the membrane (5). It is submitted that this reference system does not lead to an automatic correction of the physical and environmental parameters to which the tire or base rim are subjected.

The U.S. Pat. No. 4,384,543 to Jacob Wong teaches a combined underinflation indicator and relief valve. The reference shows bellows 18 which are sealed to the atmosphere and this causes these bellows to be sensitive to a surrounding pressure change. The device operates such that the tire maintains its full pressure regardless of tire temperature. The hot air inside of the tire will heat up the pressure responsive housing 16 and heat up the bellows 18 causing it to tend to expand and thereby counteract the air pressure inside the tire. The bellows 18 of the reference acts as temperature sensing actuator for a relief valve.

SUMMARY OF THE INVENTION

1. Purposes of the Invention

It is an object of the invention to improve the surveillance of tire pressures with simple means for elimination of erroneous actuation of the evaluation unit caused by particular temperature situations on the rim.

It is another object of the invention to simplify the construction of a surveillance unit by eliminating a requirement for thermal insulating materials.

It is yet a further purpose to provide a surveillance device which is easily accessible and maintainable.

These and other objects and advantages of the present invention will become evident from the description which follows.

2. Brief Description of the Invention

The present invention provides for a monitoring method for vehicle tire pressures. A pressure prevailing in a vehicle tire is sensed with a pressure measurement member communicating to the interior of the tire and furnishing a tire pressure dependent signal. The monitoring method for vehicle tire pressure evaluates the pressure dependent signal in an evaluation device connected to the pressure measurement member. The monitoring method for vehicle tire pressure actuates a final function device depending on the evaluating of the signal of the pressure measurement member in cases where the tire pressure drops to below a tire pressure limiting value. The monitoring method for vehicle tire pressure corrects the signal being evaluated with a second signal from a correction member exposed to a temperature prevailing outside of the tire and connected to the evaluation device for correcting the signal delivered by the pressure measurement member depending on the temperature prevailing outside.

The monitoring method for vehicle tire pressures preferably disposes pressure measurement member outside of the tire. The pressure measurement member is advantageously integrated with the correction member into a single integrated construction. A pressure line is installed connecting an interior of a tire to the pressure measurement member. The monitoring method feeds the tire pressure of the tire to the pressure measurement member via the pressure line.

A pressure measurement box forming the pressure measurement member is mechanically expanded and contracted for deriving a mechanical motion capable of acting on a valve member. The pressure measurement member is preferably placed at a distance of at least about 0.2 times the width f the tire away from the tire.

The invention avoids the use of thermally insulating materials and the danger of operating disturbances based on failures associated with these thermally insulating materials.

The incorporation location of the device at the base of the rim, in particular because of the disposition of the braking device in the rim is difficult to access. The invention is associated with the advantage that the correction device can be disposed at a location which is easier accessible and thus the invention device can be easier repaired, exchanged and/or maintained. This advantage is particularly important in connection with commercial vehicles, where the failures and difficulties of the recited incorporation location at the rim base is even made worse based on the usual twin wheels employed. In embodiments, where the pressure measurement member and the correction member are integrated into a single unit there results the further advantage that also both the pressure measurement member as well as the total device, including the evaluation unit can be disposed at a more accessible location.

The invention absolves itself from the prevailing prejudice based upon which it is indispensible to perform the temperature depending correction of the signal of the pressure measurement member according to the tire air temperature. The tire air temperature is a resulting temperature derived from the ambient temperature and from a component which is based on a tire heating based on operating conditions. The latter component based on operating conditions can be of different size depending on the construction of the tire and the flexing of the tire depending thereupon. Commercial vehicle tires, where the comfort of running is less important, are usually produced of a relatively stiff consistancy and consequently generate a relatively low flex work and consequently also a relatively low increase of the tire air temperature based on flexing. The invention neglects the last recited and illustrated components of the flexing and performs a correction of the signal of the pressure measurement member based on the ambient temperature. If the tire pressure drop, required for the actuation of the evaluation device, is designated as a response threshold level of the device then this response threshold level according the state of the art remains equal as it relates to the total region of possibly occurring tire air temperatures. In contrast, according to the invention, the response threshold is changed in case of higher tire air temperatures. This is associated with the advantage that the invention, in contrast to the state of the art, reacts with less sensitivity and thereby focusses or and renders possible a the recognition of real errors and actual problems relating to the tire pressure.

During a pause of operation a complete temperature balancing between the ambient temperature and the tire air temperature occurs. After a temperature balancing the signal of the pressure measurement member of a device formed according to the prevailing assumption and the teaching of the art is corrected relative to the ambient temperature. The consequence of this is that the response thresholds of the invention and of the known device are equal for the important operating situation "start of driving after an operating pause" and thus, in this state also the sensitivity of the two methods are equal.

Further advantages of the invention are cited in connection with the illustration and description of the embodiments of the drawings. The drawings employ throughout dash dotted lines for electrical connections and fully drawn lines for pressure connections as well as the same reference numerals for elements performing the same function.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
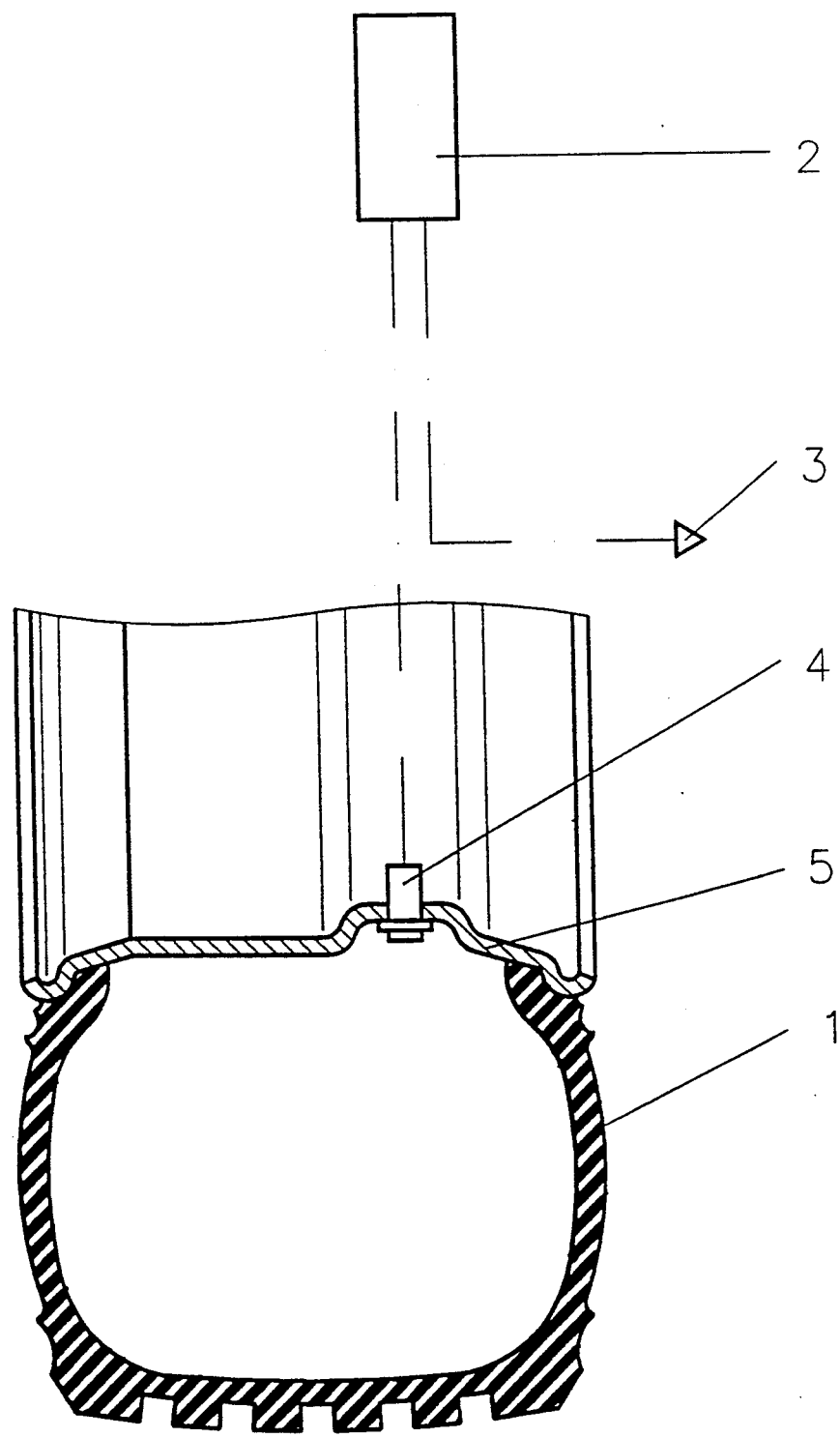
FIG. 1 is a view of a schematic and in part sectional diagram, of a device for a tire pressure surveillance.

The embodiments illustrated in FIG. 1 for tire pressure surveillance and monitoring includes a pressure measurement member 4 disposed in or at a rim base 5 receiving the tire 1 and having a connection to the interior of the tire. A pressure measurement member 4; 11; 21, 34 furnishes a tire pressure dependent signal. An evaluation device 2; 32, 24, 29, 26, 27 is actuated by the signal of the pressure measurement member 4; 11; 21, 34 upon dropping of the tire pressure to below a tire pressure limiting value. A correction member 2, 3 corrects the signal of the pressure measurement member 4, 11; 21, 34 depending on the temperature. The correction member 2, 3, 21, 34 is disposed to a temperature prevailing outside of the tire 1.

The pressure measurement member 11; 21, 34 is disposed outside of the tire. The pressure measurement member 21, 34 and the correction member 21, 34 can be constructively integrated. The tire pressure of the device is fed in via a pressure line 10. The pressure measurement member can be furnished by a pressure measurement box 21, 34. The distance between the pressure measurement member and the tire is preferably at least 1/5 of the width of the tire.

The pressure measurement member 4 is preferably not sensitive to temperature and furnished, for example, by a piezo-pressure gauge and receiver or by a piezo-electric element. The signal depending on the tire pressure is fed to an electronic circuit 2. In addition, the temperature sensor 3 is furnished for sensing the ambient temperature, where the temperature dependent signal of the temperature sensor 3 is also fed to the electronic circuit 2.

The electronic circuit 2 serves simultaneously as a signal preparing circuit and has an evaluation arrangement for the device for tire pressure surveillance. The electronic circuit 2 provides in addition to other signal preparation steps a correction of the signal of the pressure measurement member 4 according to the signal of the temperature sensor 3 based on its property as a signal processing device. The electronic circuit 2 forms, together with the temperature sensor 3, a correction member 2, 3 which corrects the signal of the pressure measurement member 4 depending on temperature.

The electronic circuit 2 is formed such that it reacts in one or several known kinds to the signal of the pressure measurement member 4 corrected depending on temperature, based on the property of the electronic circuit 2 as an evaluation arrangement. The electronic circuit 2 is further actuated by the pressure measurement member 4 if the pressure measurement member 4 furnishes a signal, which falls below a stored tire pressure limiting value.

The actuation of the electronic circuit 2 can be performed in any desirable way, for example, by switching of a warning circuit and/or for controlling of a tire pressure automatic control device.

Figure 2:
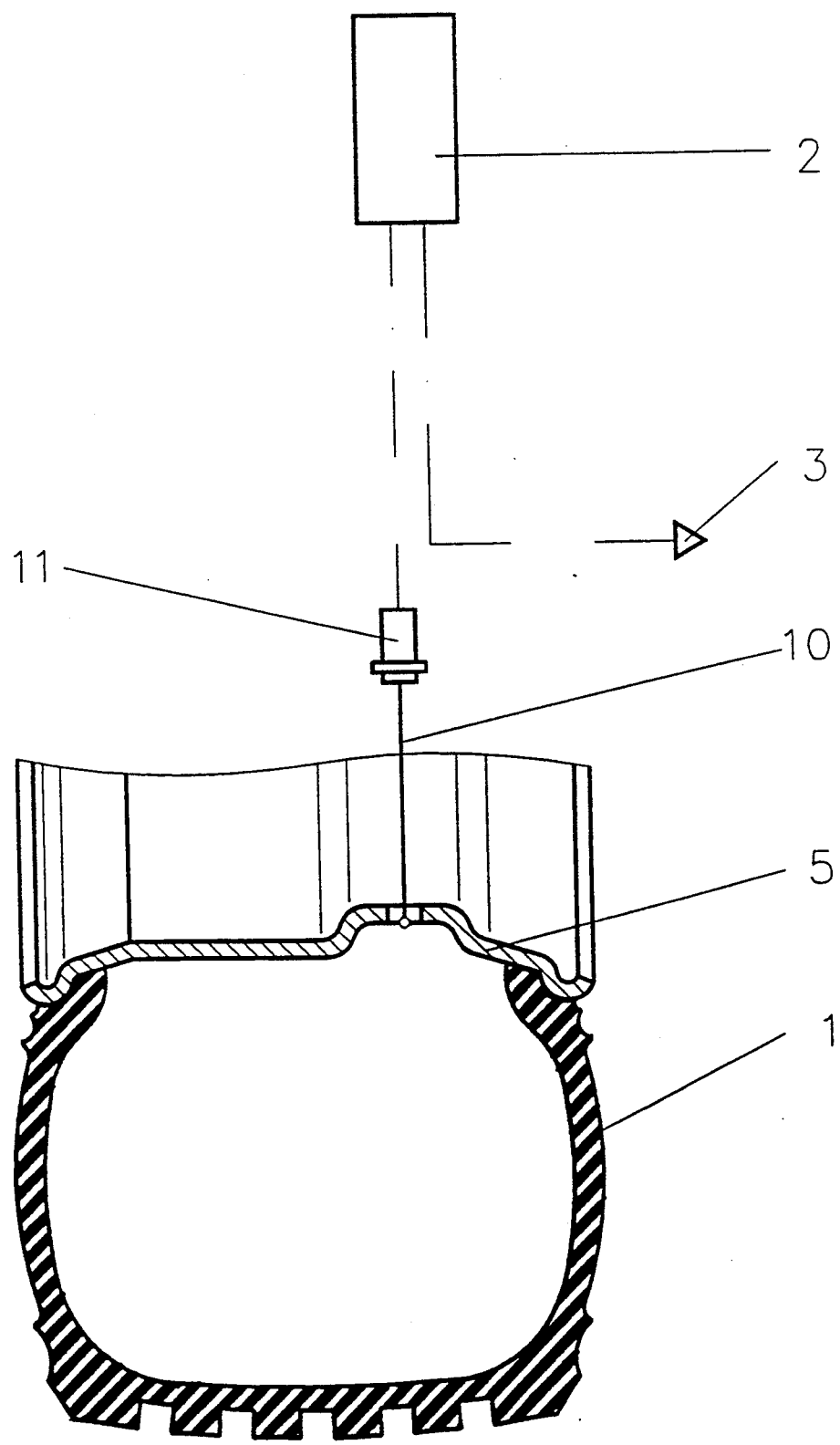
FIG. 2 is a view of a schematic and in part sectional diagram of another embodiment of the device illustrated in FIG. 1.

The pressure measurement member 11 is illustrated in FIG. 2 disposed remote relative to the rim base 5. The tire pressure is fed to the pressure measurement member 11 via an opening 41 disposed in the rim base 5 and a pressure line 10 is connected to the opening 41 in the rim base 5. The pressure measurement member 11 can be functionally identical with the pressure measurement member 4 of FIG. 1, but it can also operate according to any other suitable principle.

Figure 3:
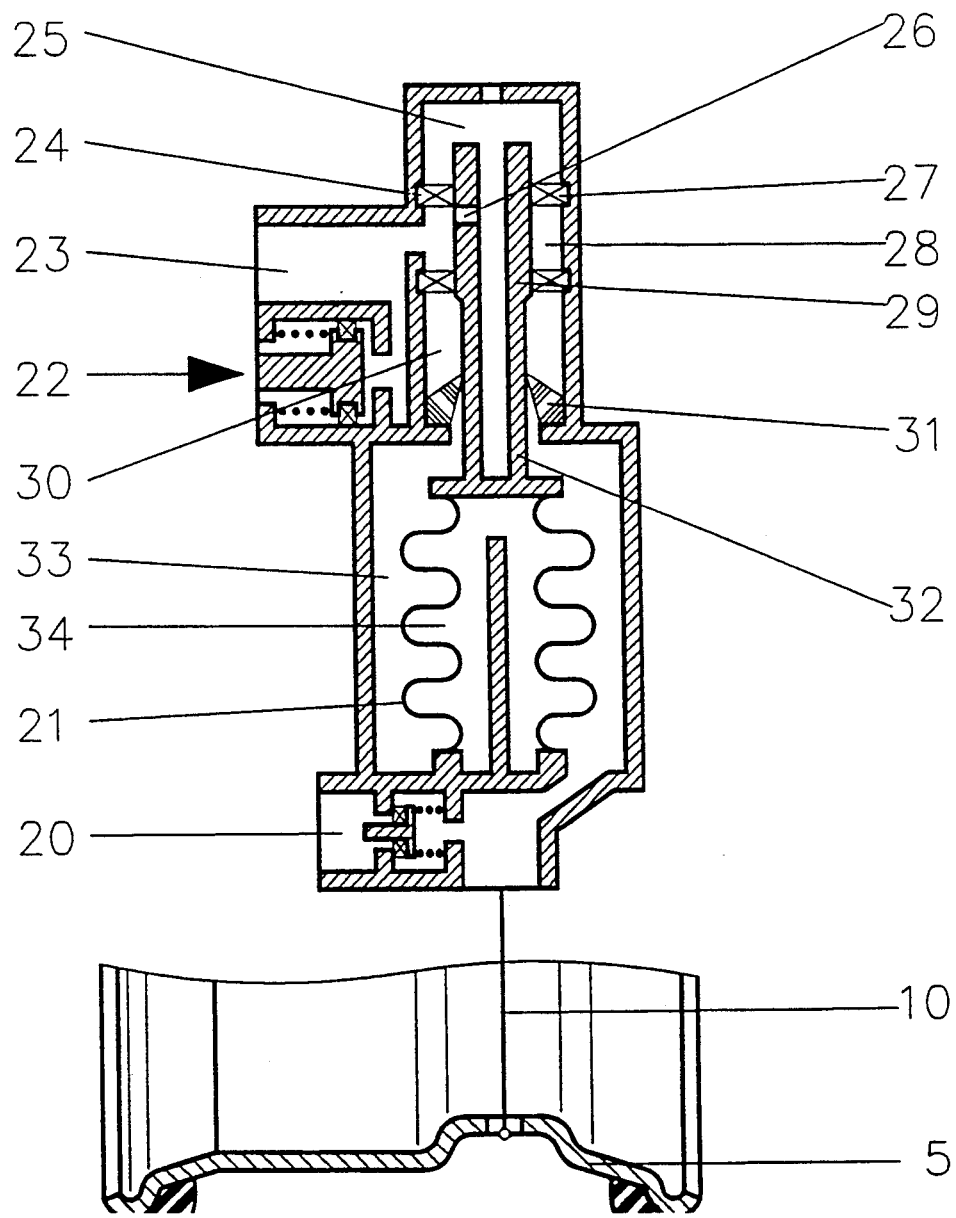
FIG. 3 is a schematic sectional view of a further embodiment of the device for tire pressure surveillance.

The device illustrated in FIG. 3 for tire pressure surveillance includes the pressure measurement member, the correction member and the evaluation device in a casing designated as 43 and in general disposed at a distance from the rim flange 51 and remote from the rim base 5.

The pressure measurement member and the correction member are integrated according to this embodiment in the structure of a pressure measurement box 21, 34.

The pressure measurement box 21, 34, which can be furnished by bellows, is disposed in a first casing chamber 33, which is fed with the tire pressure via the pressure line 10 recited above. The pressure measurement box 21, 34 is supported at its one end in a casing 43 and is connected at its opposite end with a valve slider 32 where the valve slider 32 starting from the first casing chamber 33, penetrates a second casing chamber 30 and a third casing chamber 28 and penetrates into a surrounding chamber 25. The surrounding chamber 25 is connected via an opening 45 with the ambient while the third casing chamber 28 is connected to the signal output port 23.

The valve slider 32 exhibits a control edge 29 and a control bore 26. The control edge 29 forms with the control face 24 a first valve 24, 29 at a case wall separating the second casing chamber 30 from the third casing chamber 28. The control bore 26 forms together with the control collar 27 a second valve 26, 27, disposed at the separating casing wall separating the third casing chamber 28 from the surrounding chamber 25. The control bore 26 and the control edge 29 are disposed at the valve slider 32. The control collars 24 and 27 are disposed such at the casing that they are connecting, in each case while the other valve is closed, the second casing chamber 30 via the first valve 24, 29, to the third casing chamber 28 and the third casing chamber 28 via the second valve 26, 27, to the surrounding chamber 25.

The valve slide or valve spool 32 penetrates a sealing element with lip construction between the first casing chamber 33 and the second casing chamber 30, which sealing element of lip construction is formed as a check valve 31 allowing open flow from the first casing chamber 33 to the second casing chamber 30 and blocking in opposite direction.

A reference volume 34 of air or of another gas under pressure is enclosed in the pressure measurement box 21, 34.

The seal collar or elastic body 31 can be formed as a ring having an inner conical face with a relatively smaller cone angle and having an outer conical face with a relatively larger cone angle, where the inner cone and the outer cone intersect approximately at the position contacting the diameter 47 of the valve slider 32.

The entire first inlet valve 24, 49 can be disposed opposite to a connection opening from the pressure inlet port 52 to the chamber 33. The arrangement of the pressure inlet port 52, of the chamber 33, of the check valve 47, 31 can be disposed along a axis disposed in parallel to the axis of the valve slider 32. The signal-generating device 22, and the pressure discharge port 23 can be disposed essentially in a plane disposed through the axis of the valve slider 32. The pressure inlet port 52 comprises preferably a cylindrical tube which is aligned in parallel to the valve slider axis. The pressure discharge outlet port 23 is preferably a cylindrical tube which is directed perpendicular to the valve slider axis. Preferably, the direction of the spring action of the box 21 is disposed parallel to the slider axis.

If the tire is not filled, i.e. the tire pressure corresponds to ambient pressure, then the pressure measurement box 21, 34 assumes its base construction length. In this base construction length of the pressure measurement box 21, 34, the first valve 24, 29 is opened and the second valve 26, 27 is closed.

If the tire is now filled and for this purpose there is furnished at the casing a tire fill connection 20 in such way that the tire pressure building up in the first casing chamber 33 is also present in the second casing chamber 30 and passes from the second casing chamber 30 via the open first valve 24, 29 into the third casing chamber 28 and into the signal output 23. The pressure at the signal output 23 forms a tire pressure error signal.

The construction length of the pressure measurement box 21, 34 is shortened under the effect of the tire pressure under sliding of the valve slider 32 in the first casing chamber 33. Upon a certain shortening of the pressure measurement box 21, 34, the first valve 24, 29 is closed and the second valve 26, 27 is opened. Now the signal output 23 is connected via the third casing chamber 28 and via the opened second valve 26, 27 to the surrounding chamber 25 and thus with the consequence that the tire pressure error signal drops. The tire pressure at which this drop occurs is designated as tire pressure limiting value. In case of a further increasing tire pressure, the construction length of the pressure measurement box 21, 34 becomes shortened without that the respective sliding of the valve slider 32 influences the state of the valves 24, 29 or, respectively 26, 27.

If the tire pressure now drops again from the first reached value, then the construction length of the pressure measurement box 21, 34 is increased again under back sliding of the valve slider 32. If the tire pressure drops down to the recited tire pressure limiting value then the construction length of the pressure measurement box 21, 34 increases and expands just again to the base construction length, where the first valve 24, 29 is opened and where the second valve 26, 27 is closed. The tire pressure now passes again on the above recited path as a tire pressure error signal to the signal output 23.

It is a consequence of the above recited functional description that the construction length change of the pressure measurement box 21, 34 occurs as the tire pressure dependent signal of the pressure measurement box 21, 34 and that the valve slider 32 in connection with the valve 24, 29; 26, 27 is designated as the evaluation device actuated by the signal of the pressure-sensitive measurement member 21, 34.

The pressure of the reference volume contained in the measurement box 21, 34 depends on the filling pressure and on the temperature of the reference volume. The base construction length and the operating construction length of the measurement box 21, 34 with increasing or, respectively, falling temperature versus an assumed standard temperature has the consequence that the tire pressure limiting value rises or drops in comparison with the value coordinated to the standard temperature.

The reference volume 34 is subjected to the ambient temperature at the place of attachment of the above described device for tire pressure surveillance. Consequently, the immediately above recited changes of the tire pressure limiting value are appearing depending on the ambient temperature. This means, in general, that the signal of the pressure measurement member is corrected depending on the ambient temperature.

It is assured based on the check valve 31 that the tire pressure having passed once through the signal output 23, remains retained as the tire pressure error signal in a case of tire pressures below the tire pressure limiting value, and also in case of a complete drop of the tire pressure.

The tire pressure error signal can be employed similar to the actuation of the electronic circuit 2 of the preceding embodiment.

The mechanical pressure deficiency display is designated with reference numeral 22, which mechanical pressure deficiency display is actuated by the tire pressure passing through to the signal output 23.

In addition, the explanation provided above to one embodiment holds also directly or correspondingly for the remaining embodiments, unless nothing to the contrary is stated above. A person of ordinary skill will recognize that the area of protection of the invention is not limited by the specific examples, but comprises all embodiments which are falling under the features set forth in the patent claims.

It will be understood that each of the elements described above, or two or more together, may also find a useful application in other types of compressed air system configurations and gas pressure monitoring procedures differing from the types described above.

While the invention has been illustrated and described as embodied in the context of a device for surveillance of tire pressures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for tire pressure surveillance comprising a housing disposed outside of a tire;
    a pressure measurement and correction member disposed in the housing, communicating to the interior of the tire and furnishing a tire pressure dependent signal correcting the signal delivered by the pressure measurement member depending on temperature, wherein the pressure measurement and correction member is exposed to a temperature prevailing outside of the tire;
    an evaluation device connected to the pressure measurement and correction member and actuated by the signal of the pressure measurement member in cases where the tire pressure drops to below a tire pressure limiting value, said evaluation device including a valve slider connected to the measurement and correction member and wherein the valve slider forms with the housing a first valve for communicating the pressure within the tire to an error signal output port when the tire pressure drops to below a tire pressure limiting value and wherein the valve slider forms with the housing a second valve to communicate ambient pressure to said error signal output port when said tire is properly inflated.

2. The device according to claim 1, wherein the pressure measurement and correction member is disposed outside of the tire.

3. The device according to claim 2, wherein the pressure measurement and correction member is of an integrated construction.

4. The device according to claim 2 further comprising
    a pressure line connecting an interior of a tire to the pressure measurement and correction member, wherein the tire pressure of the tire is fed in via the pressure line.

5. The device according to claim 1, wherein the pressure measurement and correction member is a pressure measurement box.

6. The device according to claim 1, wherein the distance between the pressure measurement and correction member and the tire is at least about 0.2 times the width of the tire.

7. The device according to claim 1 further comprising a pressure line connecting an interior of a tire to the pressure measurement and correction member, wherein the tire pressure of the tire is fed in via the pressure line, wherein the pressure measurement and correction member is a pressure measurement box and wherein the distance between the pressure measurement and correction member and the tire is at least about 0.2 times the width of the tire.

8. Device according to claim 1, wherein the evaluation device includes an electronic circuit.

9. Device according to claim 1, wherein the pressure measurement and correction member includes a pressure measurement box.

10. Device according to claim 1, wherein the evaluation device includes an electronic circuit; and wherein the evaluation member includes a valve slider, an electronic circuit, a temperature sensor, and a pressure measurement box.

11. Device for tire pressure surveillance with a pressure measurement and correction member (4; 11; 21, 34) furnishing a tire pressure dependent signal and correcting depending on the temperature the signal of the pressure measurement member (2, 3; 4; 11; 21, 34), wherein the measurement and correction member (2, 3; 4; 11; 21, 34) is disposed outside of the tire and is subjected to a temperature prevailing outside of the tire (1), and an evaluation device (2; 32, 24, 29, 26, 27) actuated by the signal of the pressure measurement and correction member (2, 3; 4; 11; 21, 34) upon dropping of the tire pressure to below a tire pressure limiting value, wherein said evaluation device includes a valve slider connected to the correction member and wherein the valve slider forms with a housing a first valve (24, 29) for communicating the pressure within the tire to an error signal output port when the tire pressure drops to below a tire pressure limiting value and wherein the valve slider forms with the housing a second valve (26, 27) to communicate ambient pressure to said error signal output port when said tire is properly inflated.

12. Device according to claim 11, wherein the evaluation device (2, 32, 24, 29, 26, 27) includes an electronic circuit (2).

13. Device according to claim 11, wherein the pressure measurement and correction member (11; 21, 34) is disposed outside of the tire.

14. Device according to claim 13, wherein the pressure measurement and correction member (21, 34) is constructively integrated.

15. Device according to claim 13, wherein the tire pressure of the device is fed in via a pressure line (10).

16. Device according to claim 11, wherein the pressure measurement and correction member is a pressure measurement box (21, 34).

17. Device according to claim 11, wherein the distance between the pressure measurement and correction member and the tire is at least 1/5 of the width of the tire.

18. Device according to claim 11, wherein the pressure measurement and correction member (11; 21, 34) is disposed outside of the tire, wherein the pressure measurement and correction member 21, 34 is constructively integrated, wherein the tire pressure of the device is fed in via a pressure line (10), wherein the pressure measurement and correction member is a pressure measurement box (21, 34), and wherein the distance between the pressure measurement and correction member and the tire is at least 1/5 of the width of the tire.

19. Device according to claim 11, wherein the pressure measurement and correction member includes a pressure measurement box (21, 34).

20. Device according to claim 11, wherein the evaluation device 2, 32, 24, 29, 26, 27) includes an electronic circuit (2).

21. A monitoring method for vehicle tire pressures comprising sensing a pressure prevailing in a vehicle tire with a pressure measurement and correction member disposed outside of the tire, communicating to the interior of the tire and furnishing a tire pressure dependent signal;

correcting the tire pressure dependent signal depending on the temperature prevailing outside of the tire with the pressure measurement and correction member exposed to a temperature prevailing outside of the tire;

evaluating the pressure dependent signal in an evaluation device connected to the pressure measurement member;

communicating the pressure within the tire to an error signal output port when the tire pressure drops to below a tire pressure limiting value;

communicating ambient pressure to said error signal output port when said tire is properly inflated.

22. The monitoring method for vehicle tire pressures according to claim 21 further comprising disposing the pressure measurement and correction member outside of the tire.

23. The monitoring method for vehicle tire pressures according to claim 21 further comprising integrating the pressure measurement and correction member into a single integrated construction.

24. The monitoring method for vehicle tire pressures according to claim 23 further comprising mechanically expanding and contracting a pressure measurement box forming the pressure measurement and correction member for deriving a mechanical motion capable of acting on a valve member.

25. The monitoring method for vehicle tire pressures according to claim 23 further comprising placing the pressure measurement and correction member at a distance of at least about 0.2 times the width of the tire away from the tire.

26. The monitoring method for vehicle tire pressures according to claim 21 further comprising installing a a pressure line connecting an interior of a tire to the pressure measurement and correction member; and feeding the tire pressure of the tire to the pressure measurement and correction member via the pressure line.

27. The monitoring method for vehicle tire pressures according to claim 21 further comprising disposing the pressure measurement and correction member outside of the tire;

integrating the pressure measurement and correction member into a single integrated construction;

installing a pressure line connecting an interior of a tire to the pressure measurement and correction member;

feeding the tire pressure of the tire to the pressure measurement and correction member via the pressure line;

mechanically expanding and contracting a pressure measurement box forming the pressure measurement and correction member for deriving a mechanical motion capable of acting on a valve member; and placing the pressure measurement and correction member at a distance of at least about 0.2 times the width of the tire away from the tire.

28. The device for tire pressure surveillance according to claim 21 further comprising actuating a final function device depending on the evaluating of the signal of the pressure measurement member.

29. A device for tire pressure surveillance comprising:

a pressure measurement member disposed within a housing, wherein the pressure measurement member is disposed outside of the tire, being exposed to a temperature prevailing outside the tire, and connected to the interior of the tire;

a valve slider within the housing connected to said pressure measurement member;

a first valve portion formed on the slider cooperating with a first element within the housing to communicate the pressure within the tire to an error signal output port in response to the actuation of the pressure measurement member when the tire pressure drops below a tire pressure limiting value;

a second valve portion formed on the valve slider cooperating with a second element in the housing to communicate ambient pressure to said error signal output in response to the pressure measurement means when said tire is properly inflated.

30. A device for tire pressure surveillance comprising a housing disposed outside of a tire;

a pressure measurement member disposed in the housing and communicating to the interior of the tire and furnishing a tire pressure dependent signal;

an evaluation device connected to the pressure measurement member and actuated by the signal of the pressure measurement member in cases where the tire pressure drops to below a tire pressure limiting value and furnishing a correction member for correcting the signal delivered by the pressure measurement member depending on temperature, wherein the correction member is exposed to a temperature prevailing outside of the tire;

a valve slider disposed in the housing and connected to the evaluation device;

a first valve formed by a first portion of the slider and a portion of the housing for generating a first type signal when the tire pressure drops to below a tire pressure limiting value;

an error signal output port formed at the housing and connected to the first valve for receiving the first type signal and for communicating the first type signal;

a second valve formed by a second portion of the slider and a portion of the housing and communicating to the output port for generating a second type signal when the tire pressure is properly inflated and for delivering the second type signal to the output port.

* * * * *